United States Statutory Invention Registration [19]

[11] Reg. Number: H681

Weideman [43] Published: Sep. 5, 1989

[54] DOT MATRIX PRINT DETECTOR

[76] Inventor: William E. Weideman, 3503 Hastings Dr., Arlington, Tex. 76013

[21] Appl. No.: 58,515

[22] Filed: Jun. 5, 1987

[51] Int. Cl.[4] ..... G06K 9/18; G06K 9/48; G06K 9/40

[52] U.S. Cl. ..... 382/11; 382/22; 382/54

[58] Field of Search ..... 382/9, 10, 11, 14, 18, 382/22, 34, 48, 54, 56

[56] References Cited

U.S. PATENT DOCUMENTS

| | | | |
|---|---|---|---|
| 3,634,822 | 1/1972 | Chow | 382/39 |
| 3,737,855 | 6/1973 | Cutaia | 382/54 |
| 4,263,504 | 4/1981 | Thomas | 235/454 |
| 4,274,079 | 6/1981 | Todd et al. | 382/61 |
| 4,339,208 | 7/1982 | Biedermann | 400/124 |
| 4,484,068 | 11/1984 | Mazumder | 235/462 |
| 4,559,644 | 12/1985 | Kataoka et al. | 382/9 |
| 4,561,022 | 12/1985 | Bayer | 382/54 |
| 4,691,366 | 9/1987 | Fenster et al. | 382/22 |

*Primary Examiner*—Stephen C. Buczinski
*Assistant Examiner*—Linda J. Wallace

[57] ABSTRACT

A dot matrix print detector (24) for use in an optical character recognition system for detecting the presence of characters on a document printed in a dot matrix print format is provided. A scanning device (26) generates pixel signals representing pixel values of portions of characters in a predetermined area appearing on the document. A filter (28) functions to generate filtered signals representing energy levels of pixels associated with the edges of the characters. Summation circuitry (30, 32) is provided for determining the energy levels of the filtered signals for the predetermined area and for generating a summation signal. Summation circuitry (38, 40) generates a summation signal representing the energy levels of unfiltered pixel elements or low pass filtered pixel elements. The output of the summation circuitry (40, 32) is applied to a decision circuit (34) for determining the presence of dot matrix print in the predetermined area.

12 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DOT MATRIX PRINT DETECTOR

TECHNICAL FIELD

This invention relates to optical character recognition systems, and more particularly to a dot matrix print detector to assist in the character recognition process.

BACKGROUND ART

Document processing systems optically read information from documents. Numerous optical character recognition techniques are utilized for distinguishing between different print fonts and for identifying the individual characters themselves. As used herein, the word "characters" shall include alphanumeric characters as well as bar code data. Characters may be printed in a continuous format typically referred to as contiguous print or in a dot matrix print format in which rows and columns of dots are utilized to create a character.

Since character recognition involves numerous parameters associated with a character, whether a character is contiguous or represented by dot matrix print is an important piece of information in recognizing the character. Various template and feature recognition algorithms are utilized for optical character recognition techniques. Different masks for template recognition are utilized to recognize dot matrix print since feature recognition algorithms do not produce the desired results in recognizing dot matrix print characters. Therefore, if the presence of a dot matrix print character were known, algorithms that are specifically directed to the recognition of dot matrix print characters could be utilized instead of methods for recognizing contiguous characters. Further, knowledge of the presence or absence of a dot matrix print character would be useful in character segmentation and contextual post-processing of the recognition results.

A need has thus arisen for a dot matrix print detector for identifying the presence or absence of a dot matrix print character to assist in the character recognition process.

DISCLOSURE OF THE INVENTION

In accordance with the present invention, a dot matrix print detector for use with an optical character recognition system is provided. The detector includes structure for scanning a document containing the characters and for generating pixel signals representing pixel values for portions of the characters appearing on the document. A filter is provided for receiving the pixel signals and for generating a filtered signal representing energy levels of pixels associated with edges of the characters. A summing circuit is provided for determining the energy level of the filtered signals for a predetermined area on the document and for generating a first energy signal. A second summing circuit is provided for determining the energy level of the pixel signals generated by the scanning structure for the predetermined area and for generating a second energy signal. A comparator compares the first and second energy signals for generating a signal indicating the presence of dot matrix print in a character on the document in the predetermined area.

BRIEF DESCRIPTION OF THE DRAWINGS

For a complete understanding of the present invention and for further advantages thereof, reference is now made to the following Detailed Description taken in conjunction with the accompanying Drawings in which.

DETAILED DESCRIPTION

Figure 1:
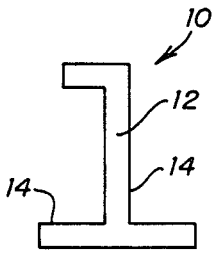
FIG. 1 is an enlarged illustration of a contiguous print character.
Figure 2:
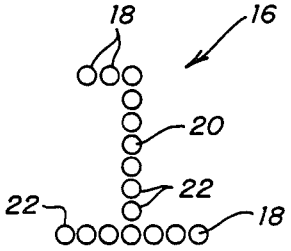
FIG. 2 is an enlarged illustration of a dot matrix print character.

Referring simultaneously to FIGS. 1 and 2, FIG. 1 illustrates a contiguous character generally identified by the numeral 10. Contiguous character 10 includes an interior portion 12 and edges 14. Edges 14 are continuous and form the outer boundary of contiguous character 10.

FIG. 2 illustrates a dot matrix print character, generally identified by the numeral 16. Dot matrix print character 16 includes a plurality of dots 18 used to form the character. Each of the dots 18 include an interior portion 20 and an edge portion 22.

Figure 3:
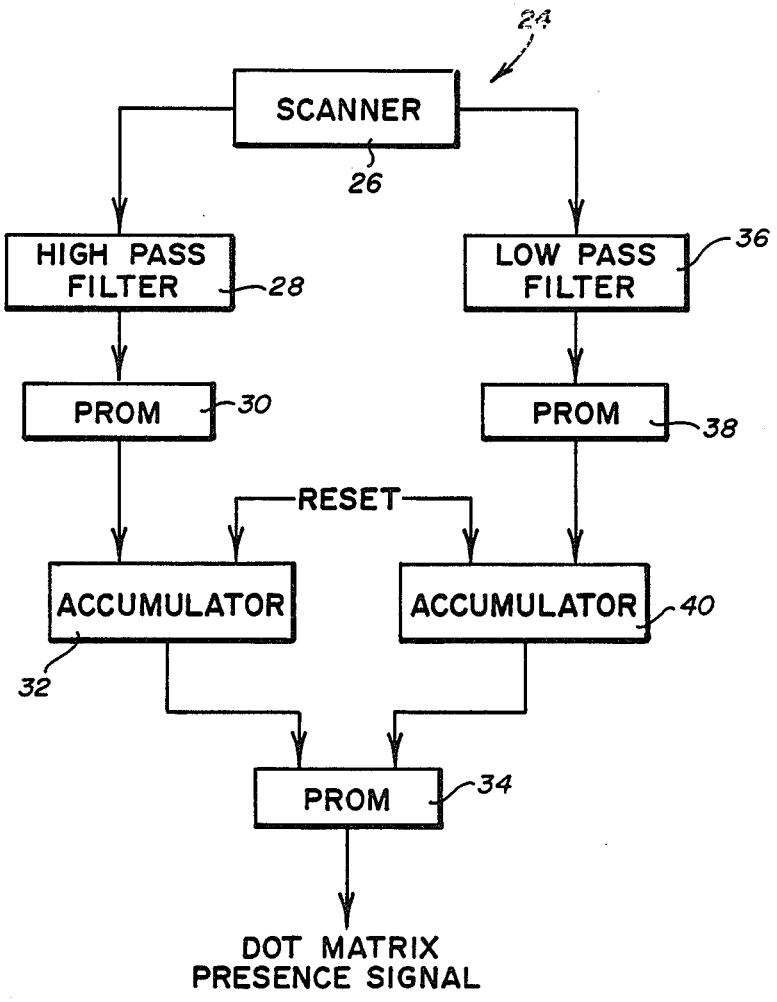
FIG. 3 is a block diagram of the present dot matrix print detector.

Referring to FIG. 3, a block diagram of the present dot matrix print detector is illustrated and is generally identified by the numeral 24. Dot matrix print detector 24 includes an optical character scanning device 26 which responds to light in the visible, infrared, X-ray or ultraviolet spectrum and preferably responds according to the human eye or photopic response. Scanner device 26 may include, for example, a CCD self-scanned array. The output of scanner device 26 provides a signal proportional to the reflectivity of the document at each sample or picture element (pixel) point.

The output of scanner device 26 representing raw video data in the form of pixel values is supplied to a high pass filter 28. High pass filter 28 allows energy of the dots 18 which compose a dot matrix print character 16 to pass while attenuating the energy of low frequencies associated with a contiguous character (FIG.1). High pass filter 28 may comprise, for example, a finite impulse response (FIR) or an infinite impulse response (IIR) filter. The output of high pass filter 28 representing the strength of the edges 14 or 22 of a character 10 or 16, respectively, is then totalled to represent the total energy level of edges of an area which may contain a character on the document.

The total energy level of the high pass filtered signal from high pass filter 28 for the given area is computed in accordance with Parseval's theorem in which the energy value for a particular pixel, row and column, is squared and the sum of the squared pixel energy values for the desired area are summed. Therefore, the output of high pass filter 28 is applied to a programmable read only memory (PROM) 30 which functions to square the pixel energy level output by high pass filter 28. The output of PROM 30 is applied to an accumulator 32 which functions to accumulate the individual pixel energy levels for the desired area of interest. The output of accumulator 32 is applied to a programmable read only memory (PROM) 34 which is a decision PROM for determining the presence of dot matrix print in the area of interest.

PROM 34 makes a comparison between the energy level of the high pass filtered signal with an energy level from an arbitrary filter such as, for example, a band stop filter, no filter at all or as shown in the FIGURE, a low pass filter 36. Low pass filter 36 may comprise, for example, a FIR or IIR filter functions to pass energy associated with the interior portions 12 or 20 of characters 10 or 16, respectively. These energy levels are applied to a PROM 38 which squares the energy level per pixel. The output of PROM 38 is applied to an accumulator 40 for summing the energy levels associated with the area of interest. The output of accumulator 40 is applied to PROM 34.

The size of the desired area selected may depend upon a number of factors such as, for example, the number of points per inch in the image of the document. If the area is selected too large, the detector will respond too slowly, whereas if too small an area is selected, the detector may operate incorrectly in the area between characters or in the presence of noise. An area of 32 by 45 or 32 by 60 pixels for a 300 point per inch image is representative of an area that can be used with the present detector 24.

A reset signal is applied to both accumulators 32 and 40 in order to reset the summing operation performed by accumulators 32 and 40 when a new area of interest is scanned by scanner device 26.

PROM 34 functions to output a signal indicating the presence of dot matrix print in the area of interest. PROM 34 may function to calculate a ratio between the energy sum signal output from accumulator 32 to the energy sum signal output by accumulator 40. This ratio can then be compared to a reference value, and if the ratio exceeds the reference value, an output signal is generated by PROM 34 such as, for example, a high or "one" signal indicating the presence of dot matrix print in the area of interest. If the ratio is less than the reference value, a low signal or "zero" output is generated by PROM 34 indicating that a contiguous character is present in the area of interest or that a decision cannot be made. Alternatively, PROM 34 may calculate an energy level representing the difference between the energy level output by accumulator 32 and the energy level output by accumulator 40 and compare this difference value to a reference value. If the ratio or difference signal exceeds the threshold this determination indicates that there is sufficient signal for a potential character to be present in the area of interest. The output of PROM 34 indicates the presence of dot matrix print in the area of interest.

High pass filter 28 may comprise, for example, a Texas Instruments model TMS320; low pass filter 36 may comprise, for example, a Texas Instruments model TMS320; PROMs 30 and 38 may comprise, for example, an AMD model AM90C644; accumulators 32 and 40 may comprise, for example, a Texas Instruments model LS181; and PROM 34 may comprise, for example, an AMD model AM99C641.

It therefore can be seen that the present dot matrix print detector performs a comparison between the high pass energy levels and the low pass energy levels of a character. The total energy levels of pixels in an area of interest is calculated, and based upon a decision function, a determination is made as to whether dot matrix print is located in the area of interest.

Whereas the present invention has been described with respect to a specific embodiment thereof, various changes and modifications may be suggested to one skilled in the art, and it is intended that the present invention encompass such changes and modifications as fall within the scope of the appended claims.

I claim:

1. A dot matrix print detector for use in an optical character recognition system for detecting the presence of characters having interior portions and edges appearing on a document printed in a dot matrix format comprising:

means for scanning the document and for generating pixel signals representing pixel values of portions of potential characters appearing on the document located in a predetermined area containing a plurality of pixels;

means for filtering said pixel signals and for generating a filtered signal, said filtered signal representing edge pixels of potential characters located in said predetermined area;

first means for determining the energy level of said filtered signals for said predetermined area on the document for generating a first energy summation signal;

second means for determining the energy level of said pixel signals generated by said scanning means for said predetermined area and for generating a second energy summation signal; and means for comparing said first and said second energy summation signals and for generating an output signal indicating the presence of doth matrix print characters in said predetermined area on the document.

2. The detector of claim 1 wherein said comparing means includes means for calculating the ratio between said first energy summation signal and said second energy summation signal and for comparing said ratio to a stored reference value.

3. The detector of claim 1 wherein said comparing means includes means for calculating the difference between said first energy summation signal and said second energy summation signal and for comparing said difference to a stored reference value.

4. The detector of claim 1 wherein said filter means includes a high pass filter.

5. The detector of claim 1 wherein said means for comparing said first and said second energy summation signals generates an output signal indicating that no decision is made as to the presence or absence of a dot matrix print character in the predetermined area.

6. The detector of claim 1 and further including:

means for enhancing said pixel signals generated by said scanning means.

7. A dot matrix print detector for use in an optical character recognition system for detecting the presence of characters having interior portions and edges appearing on a document printed in a dot matrix print format comprising:

means for scanning the document and for generating pixel signals representing pixel values of portions of potential characters appearing on the document located in a predetermined area containing a plurality of pixels;

first means for filtering said pixel signals and for generating a first filtered signal, said first filter signal representing edge pixels of potential characters located in said predetermined area;

first means for determining the energy level of said first filtered signals for said predetermined area on the document and for generating a first energy summation signal;

second means for filtering said pixel signals and for generating a second filtered signal, said second filtered signal representing pixels within the interior of potential characters located in said predetermined area;

second means for determining the energy level of said second filtered signals for said predetermined area and for generating a second energy summation signal; and means for comparing said first and said second energy summation signals and for generating an output signal representing the presence of dot matrix print characters in said predetermined area on the document.

8. The detector of claim 7 wherein said comparing means includes means for calculating the ratio between said first energy summation signal and said second energy summation signal and for comparing said ratio to a stored reference value.

9. The detector of claim 7 wherein said comparing means includes means for calculating the difference between said first energy summation signal and said second energy summation signal and for comparing said difference to a stored reference value.

10. The detector of claim 7 wherein said first filter means includes a high pass filter and said second filter means includes a low pass filter.

11. The detector of claim 7 wherein said means for comparing said first and said second energy summation signals generates an output signal indicating that no decision is made as to the presence or absence of a dot matrix print character in the predetermined area.

12. The detector of claim 7 and further including:

means for enhancing said pixel signals generated by said scanning means.

* * * * *